United States Patent [19]

Ito et al.

[11] Patent Number: 4,834,204
[45] Date of Patent: * May 30, 1989

[54] STEERING ANGLE CONTROL SYSTEM FOR WHEELED VEHICLE

[75] Inventors: Ken Ito; Naohiko Inoue, both of Yokohama, Japan

[73] Assignee: Nissan Motor Co., Ltd., Japan

[*] Notice: The portion of the term of this patent subsequent to Sep. 1, 2004 has been disclaimed.

[21] Appl. No.: 24,862

[22] Filed: Mar. 13, 1987

Related U.S. Application Data

[63] Continuation of Ser. No. 773,622, Sep. 9, 1985, abandoned.

[30] Foreign Application Priority Data

Sep. 10, 1984 [JP] Japan ............................ 59-188158
Nov. 12, 1984 [JP] Japan ............................ 59-236650

[51] Int. Cl.$^4$ ............................................. B62D 5/06
[52] U.S. Cl. ................................... 180/140; 180/142; 364/424.1
[58] Field of Search .............. 180/140, 141, 142, 143, 180/132; 280/91; 364/424, 425

[56] References Cited

U.S. PATENT DOCUMENTS

| | | | |
|---|---|---|---|
| 3,866,706 | 2/1975 | Lincke | 180/142 |
| 3,897,846 | 8/1975 | Inoue | 180/142 |
| 4,175,638 | 11/1979 | Christensen | 180/140 |
| 4,412,594 | 11/1983 | Furukawa | 180/142 |
| 4,418,780 | 12/1983 | Ito | 180/142 |
| 4,441,572 | 4/1984 | Ito | 180/140 |
| 4,476,529 | 10/1984 | Nakamura | 364/424 |
| 4,690,431 | 9/1987 | Ito et al. | 180/140 |

FOREIGN PATENT DOCUMENTS 0079754 6/1980 Japan ............................ 180/142
0026366 2/1984 Japan ............................ 180/140

OTHER PUBLICATIONS

Concurrently filed U.S. patent application, Atty. Docket No. 85ITO651RLS/ISP-Ken Ito et al., fld. Sep. 9, 1985, Title: System for Controlling Cornering Characteristics of Wheeled Vehicle.
Concurrently filed U.S. patent application, Atty. Docket No. 85ITO652RLS/ISP-Ken Ito et al., fld. Sep. 9, 1985, Title: Steering Control System for Wheeled Vehicle.
Ser. No. 755,352 filed 7/16/85, Ito et al.

*Primary Examiner*—John A. Pekar
*Attorney, Agent, or Firm*—Foley & Lardner, Schwartz, Jeffery, Schwaab, Mack, Blumenthal & Evans

[57] ABSTRACT

A control system for steering front wheels or rear wheels of a controlled vehicle has a processing unit such as a microcomputer which determines a desired value of a dynamical variable such as yaw acceleration corresponding to sensed steering wheel angle and sensed vehicle speed by solving equations of motion of a vehicle in which parameters are set equal to desired values determined by a desired vehicle. From the desired value of the dynamical variable, the processing unit determines a desired value of a steering angle of the front or rear wheels, and commands a hydraulic actuator to steer the front or rear wheels so that the controlled vehicle behaves as if it were the desired vehicle. The controlled vehicle may have a mechanical steering linkage for steering the front wheels in a conventional manner, and the control system may be arranged to control the steering angle of the rear wheels.

21 Claims, 10 Drawing Sheets

STEERING ANGLE CONTROL SYSTEM FOR WHEELED VEHICLE

This application is a continuation of application Ser. No. 773,622, filed Sept. 9, 1985, now abandoned.

BACKGROUND OF THE INVENTION

The present invention relates to a control system for steering a vehicle so as to control cornering characteristics.

In a conventional vehicle having only a mechanical steering linkage, front wheels are steered in accordance with an angular displacement of a steering wheel (steering input quantity), and a dynamical variable such as yaw rate responsive to steering input is determined uniformly by a construction of the vehicle. Therefore, cornering characteristics are fixed according to a type of vehicle. It is practically impossible to endow a vehicle of a sedan type with characteristics of a sports car type without changing a vehicle construction drastically.

A competition car (rally car) is required to have superior accelerating ability and superior steering response simultaneously. However, these two requirements are incompatible because improvement of accelerating ability by increasing engine displacement unavoidably deteriorates steering response by increasing vehicle weight.

SUMMARY OF THE INVENTION

It is an object of the present invention to provide a steering control system which can provide desired cornering characteristics to a vehicle freely without being restrained by vehicle construction.

According to the present invention, a steering control system for a controlled vehicle having a pair of first wheels and a pair of second wheels comprises (1) steering input sensing means, (2) vehicle speed sensing means, (3) target behavior determining means, (4) steering angle determining means, and (5) second wheel steering actuating means. The steering input sensing means senses a steering input quantity (such as an angular displacement of a steering wheel) representing a steering command of a driver of the controlled vehicle and determines a sensed value of the steering input quantity. The vehicle speed sensing means senses a vehicle speed of the controlled vehicle and determines a sensed value of the vehicle speed. The target determining means is connected with the steering input sensing means and the vehicle speed sensing means for determining a desired value of at least one dynamic variable (such as yaw rate, yaw acceleration, centripetal acceleration and lateral acceleration of a vehicle) corresponding to said sensed values of the steering input quantity and vehicle speed by using a group of equations of motion of a desired vehicle obtained by setting vehicle parameters appearing in the equations equal to desired values determined by said desired vehicle. The steering angle determining means is connected with the target determining means for determining a desired value of a second wheel steering angle of the second wheels required to achieve the desired value of the dynamical variable, by using the desired value of the dynamical variable and actual values of the vehicle parameters determined by the controlled vehicle. The second wheel steering actuating means steers the second wheels of the controlled vehicle so that the actual second wheel steering angle of the second wheels remains equal to the desired value of the second steering angle.

DETAILED DESCRIPTION OF THE INVENTION

Figure 1:
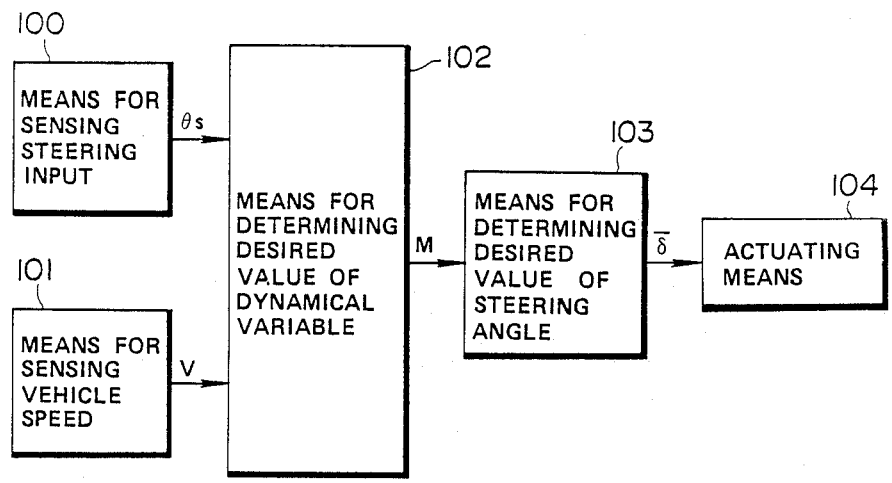
FIG. 1 is a block diagram of a steering control system according to the present invention.

As shown in FIG. 1, a control system for steering a controlled vehicle according to the present invention has a means 100 for sensing a steering input quantity such as a steering input angle $\theta_S$ of a steering wheel of the controlled vehicle, a means 101 for sensing a speed V of the controlled vehicle, a means 102 for determining a desired value M of at least one of dynamical variables such as a yaw acceleration, a means 103 for determining a desired value of a steering angle of the front or rear wheels of the controlled vehicle, and a wheel steering actuating means 104.

Figure 2:
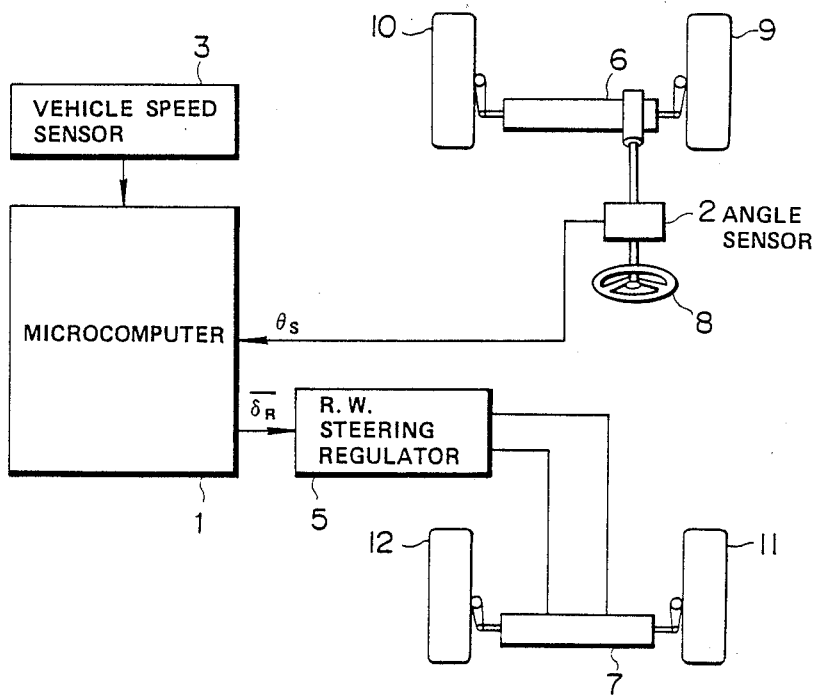
FIG. 2 is a schematic view showing an arrangement of steering control systems of first, second and third embodiments of the present invention.
Figure 3:
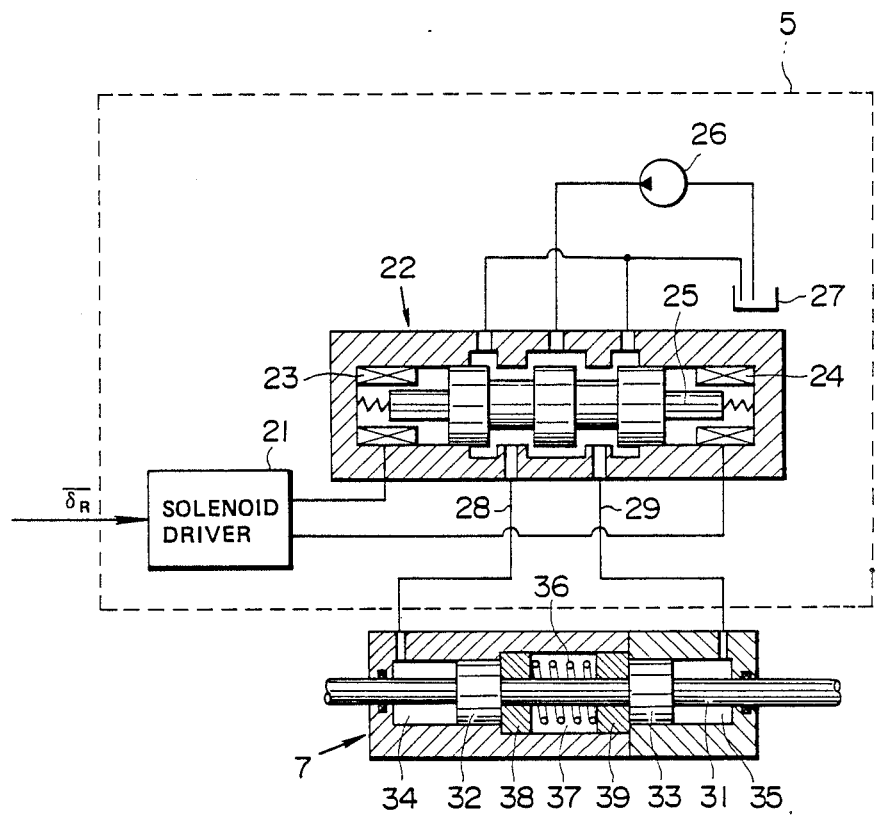
FIG. 3 is a view partly in section showing rear wheel steering regulator and actuator shown in FIG. 2.
Figure 4:
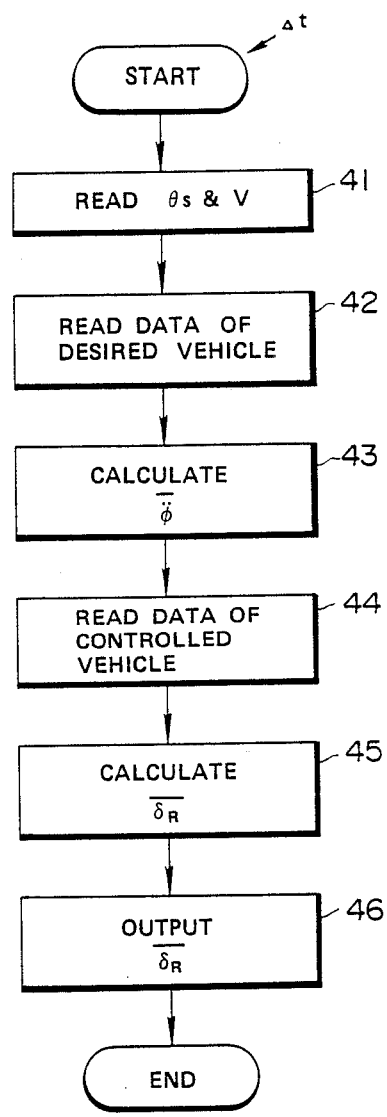
FIG. 4 is a flowchart showing a program used in the first embodiment.

A first embodiment of the present invention is shown in FIGS. 2–4. In the first embodiment, the means 100 takes the form of a steering angle sensor 2 for sensing an angular displacement of a steering wheel 8 of the controlled vehicle, and the means 101 takes the form of a vehicle speed sensor 3. A microcomputer 1 serves as both of the means 102 and the means 103.

The microcomputer 1 receives the sensed steering input quantity and the sensed vehicle speed, respectively, from the steering angle sensor 2 and the vehicle speed sensor 3, and calculates the desired value M and the desired value $\overline{\delta_R}$.

The wheel steering actuating means 104 comprises a rear wheel steering regulator 5 and a rear hydraulic steering actuator 7 for steering rear wheels 11 and 12 of the controlled vehicle.

FIG. 3 shows the rear wheel steering regulator 5 and the rear hydraulic actuator 7.

The hydraulic actuator 7 has two pistons 32 and 33 and a shaft 31 both ends of which are connected, respectively, to tie rods. The hydraulic actuator 7 steers the wheels by moving the shaft 31 axially in accordance with an oil pressure difference between right and left oil chambers 34 and 35.

In a central chamber 37 of the actuator 7, discs 38 and 39 are loosely mounted on the shaft 31. A spring 36 is disposed between the discs 38 and 39 for biasing the discs in the opposite directions. The spring 36 restores the shaft 31 to its neutral position when the oil pressure is drained from the right and left chambers 34 and 35.

The rear steering regulator 5 has a solenoid driver 21, a control valve 22, an oil pump 26 and an oil tank 27.

The control valve 22 has oil passages 28 and 29 leading, respectively, to the left and right chambers 34 and 35 of the hydraulic actuator 7. The control valve 22 further has a spool 25 which regulates the oil flow rate through the oil passages 28 and 29 by moving axially. Left and right ends of the spool 25 are surrounded, respectively, by left and right electromagnetic solenoids 23 and 24 so that the spool 25 is moved axially by the solenoids 23 and 24.

The solenoid driver 21 supplies a current signal proportional to the desired value $\bar{\delta}_R$ of the rear wheel steering angle determined by the microcomputer 1 to either of the left and right solenoids 23 and 24 which is selected in accordance with a steering direction.

Front wheels 9 and 10 of the controlled vehicle are steered through a mechanical steering linkage 6 of a conventional type in accordance with the steering input quantity of the steering wheel.

FIG. 4 shows a program executed by the microcomputer 1. Initialization is performed when an ignition switch is turned on, and power is supplied to the microcomputer 1. The microcomputer 1 repeats the program regularly at intervals of a length $\Delta t$.

At a step 41 of FIG. 4, a central processing unit (CPU) of the micrcomputer 1 reads an instantaneous value of the sensed steering input quantity $\theta_S$ and an instantaneous value of the sensed vehicle speed V which are inputted to the microcomputer 1, respectively, from the steering angle sensor 2 and vehicle speed sensor 3.

At a step 42, the CPU reads data of a desired vehicle, which are stored in a memory. The desired vehicle is not necessarily the same as the controlled vehicle on which this steering control system is mounted. For example, the desired vehicle is of a type of sports car while the controlled vehicle is of a sedan type.

In this embodiment, the data of the desired vehicle are as follows:

$I_{Z1}$ = a yawing moment of inertia of the desired vehicle,
$M_1$ = a vehicle mass of the desired vehicle,
$L_1$ = a wheel base of the desired vehicle,
$L_{F1}$ = a distance between a front axle and a center of gravity of the desired vehicle,
$L_{R1}$ = a distance between a rear axle and the center of gravity of the desired vehicle,
$I_{K1}$ = a moment of inertia about a kingpin of the desired vehicle,
$K_{S1}$ = a steering stiffness of the desired vehicle,
$D_{K1}$ = a viscosity coefficient of a steering system of the desired vehicle,
$\xi_1$ = a trail of the desired vehicle,
$N_1$ = an overall steering (gear) ratio of the desired vehicle,
$K_{F1}$ = a cornering power of each of front wheels of the desired vehicle,
$K_{R1}$ = a cornering power of each of rear wheels of the desired vehicle.

At a step 43, the CPU of the microcomputer 1 performs operations to determine a desired value of at least one of the dynamical variables. In this embodiment, the CPU determines a desired value of a yaw acceleration by using the following equations.

$$I_{K1}\ddot{\delta}_{F1}=N_1K_{S1}(\theta_S-N_1\delta_{F1})-D_{K1}\dot{\delta}_{F1}-2\xi_1 C_{F1} \quad (1)$$

$$M_1(\ddot{y}_1+\dot{\phi}_1 V)=2C_{F1}+2C_{R1} \quad (2)$$

$$I_{Z1}\ddot{\phi}_1=2L_{F1}C_{F1}-2L_{R1}C_{R1} \quad (3)$$

$$\beta_{F1}=\delta_{F1}-(\dot{y}_1+L_{F1}\dot{\phi}_1)/V \quad (4)$$

$$\beta_{R1}=-(\dot{y}_1-L_{R1}\dot{\phi}_1)/V \quad (5)$$

$$C_{F1}=K_{F1}\beta_{F1} \quad (6)$$

$$C_{R1}=K_{R1}\beta_{R1} \quad (7)$$

$$\bar{\ddot{\phi}}=\ddot{\phi}_1 \quad (8)$$

where
$\delta_{F1}$ = a steering angle of the front wheels of the desired vehicle (In this embodiment, the desired vehicle is a two-wheel steering vehicle.),
$\dot{\phi}_1$ = a yaw rate of the desired vehicle,
$\ddot{\phi}_1$ = a yaw acceleration of the desired vehicle,
$\dot{y}_1$ = a lateral speed of the desired vehicle along its lateral, or Y, axis,
$\ddot{y}_1$ = a side slipping acceleration of the desired vehicle.
$\beta_{F1}$ = a side slip angle of the front wheels of the desired vehicle,
$\beta_{R1}$ = a side slip angle of the rear wheels of the desired vehicle,
$C_{F1}$ = a cornering force of each of the front wheels of the desired vehicle,
$C_{R1}$ = a cornering force of each of the rear wheels of the desired vehicle,
$\bar{\ddot{\phi}}$ = a desired value of the yaw acceleration.

The equations (1)–(3) are equations of motion of the desired vehicle. In order to solve these equations, the CPU of the microcomputer 1 must perform four integrations in each interval of $\Delta t$. A method of integration is chosen according to the required accuracy of integration. For example, an integration method expressed as:

$$A(t+\Delta t)=A(t)+\Delta t \cdot \dot{A}(t)$$

or a Range-Kutta method may be employed.

Thus, the CPU determines the desired value $\bar{\ddot{\phi}}$ of the yaw acceleration which is a magnitude of the yaw acceleration of the desired vehicle corresponding to the instantaneous values of the steering input quantity $\theta_S$ and vehicle speed V. The control system of this embodiment is arranged to achieve the thus-determined desired value $\ddot{\phi}$ in the controlled vehicle.

At a next step 44, the CPU reads data of the controlled vehicle which are preminarily stored in the memory. In this embodiment, the data of the controlled vehicle are as follows:
$I_{Z2}$ = a yawing moment of inertia of the controlled vehicle,
$M_2$ = a vehicle mass of the controlled vehicle,
$L_2$ = a wheel base of the controlled vehicle, $L_{F2}$ = a distance between a front axle and a center of gravity of the controlled vehicle, $L_{R2}$ = a distance between a rear axle and the center of gravity of the controlled vehicle, $I_{K2}$ = a moment of inertia about a kingpin of the controlled vehicle, $K_{S2}$ = a steering stiffness of the controlled vehicle, $D_{K2}$ = a viscosity coefficient of a steering system of the controlled vehicle, $\xi_2$ = a trail of the controlled vehicle, $N_2$ = an overall steering (gear) ratio of the controlled vehicle, $K_{F2}$ = a cornering power of each of the front wheels of the controlled vehicle, $K_{R2}$ = a cornering power of each of the rear wheels of the controlled vehicle.

At a step 45, the CPU calculates a desired value $\overline{\delta}_R$ of the rear wheel steering angle of the controlled vehicle from the data of the controlled vehicle and the desired value $\ddot{\phi}$ of the yaw acceleration determined in the step 43 by using the following equations.

$$I_{K2}\ddot{\delta}_{F2} = N_2 K_{s2}(\theta_s - N_2\delta_{F2}) - D_{K2}\dot{\delta}_F - 2\xi_2 C_{F2} \quad (9)$$

$$M_2(\dot{y}_2 + \dot{\phi}_2 V) = 2C_{F2} + 2C_R \quad (10)$$

$$\beta_{F2} = \delta_{F2} - (\dot{y}_2 + L_{F2}\dot{\phi}_2)/V \quad (11)$$

$$C_{F2} = K_{F2}\beta_{F2} \quad (12)$$

$$C_{R2} = (L_{F2}C_{F2} - \tfrac{1}{2}\ddot{\phi}I_{Z2})/L_{R2} \quad (13)$$

$$\beta_{R2} = C_{R2}/K_{R2} \quad (14)$$

$$\overline{\delta}_R = \beta_{R2} + (\dot{y}_2 - L_{R2}\dot{\phi}_2)/V \quad (15)$$

$$\ddot{\phi}_2 = \ddot{\phi}_1 \quad (16)$$

where $\delta_{F2}$ = a front steering angle of the front wheels of the controlled vehicle, $\dot{\phi}_2$ = a yaw rate of the controlled vehicle, $\dot{y}_2$ = a lateral speed of the controlled vehicle along its lateral axis, $\ddot{y}_2$ = a side slipping acceleration of the controlled vehicle, $\beta_{F2}$ = a side slip angle of the front wheels of the controlled vehicle, $\beta_{R2}$ = a side slip angle of the rear wheels of the controlled vehicle, $C_{F2}$ = a cornering force of each of the front wheels of the controlled vehicle, $C_{R2}$ = a cornering force of each of the rear wheels of the controlled vehicle.

The equations (9) and (10) are equations of motion of the controlled vehicle. These equations are solved by using the integration method used at the step 43.

At a step 46, the CPU of the microcomputer 1 sends a signal representing the desired value $\overline{\delta}_R$ of the rear wheel steering angle to the rear wheel steering regulator 5.

In response to the signal from the microcomputer 1, the rear wheel steering regulator 5 supplies fluid pressure to the rear wheel steering hydraulic actuator 7, so that the rear wheels 11 and 12 are steered so as to achieve the desired value $\overline{\delta}_R$.

Therefore, the yaw acceleration of the controlled vehicle, is maintained equal to that of the desired vehicle so that the controlled vehicle has cornering characteristics identical to those of the desired vehicle. In the case that the controlled vehicle is of a sedan type and the desired vehicle is of a sports car type, the characteristics of the controlled vehicle are changed to characteristics of a sports car without changing the construction of the body of the controlled vehicle.

Figure 5:
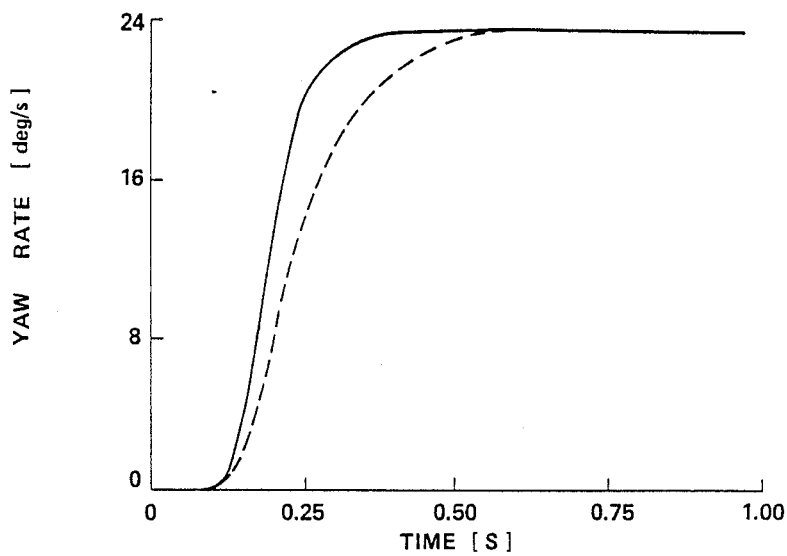
FIGS. 5 and 6 are graphs showing steering response characteristics of a vehicle equipped with the steering control system of the first embodiment.
Figure 6:
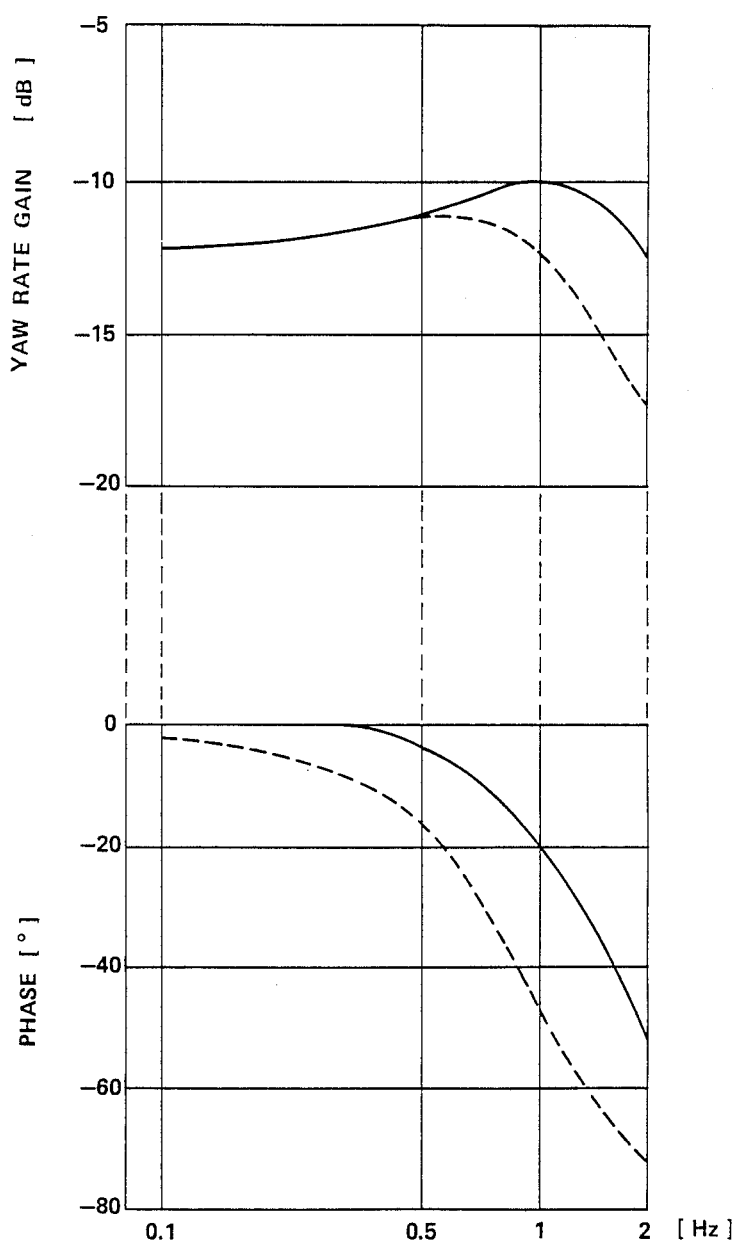

FIGS. 5 and 6 show the effect obtained by the first embodiment concretely. In the example of FIGS. 5 and 6, the controlled vehicle has an engine displacement of 2000 cc and a yawing moment of inertia of 240 kgf m s², and the desired vehicle has an equal engine displacement, and a yawing moment of inertia of 120 kgf m s². In the other data, the controlled and desired vehicles are equal.

FIG. 5 shows changes in the yaw rate when the steering wheel is turned in the manner of a step change through 120° in 0.1 second at a vehicle speed V of 50 km/h.

FIG. 6 shows frequency-response characteristics, in both gain (steering output quantity/steering input quantity) and phase difference, obtained when the steering wheel is turned sinusoidally between ±30° at a vehicle speed of 100 km/h. and the steering frequency is varied from 0.1 Hz to 2 Hz. In FIG. 6, the steering output quantity is a raw rate, so that the gain is a yaw rate gain.

In each of FIGS. 5 and 6, a solid line shows a characteristic obtained by this embodiment, and a broken line shows a characteristic of a vehicle equipped with a steering system of a conventional mechanical linkage type.

As shown in FIG. 5, the steering response characteristics are improved in the vehicle equipped with the steering control system of the first embodiment as compared with the conventional vehicle. For example, the time required for the yaw rate to reach 90% of a new steady state value is shortened to about 0.17 s whereas the conventional example requires about 0.7 s.

As shown in FIG. 6, the frequency-response characteristics are improved in the vehicle equipped with the steering control system of the first embodiment as compared with the conventional example. The gain is improved, and the phase leg is reduced especially in a high frequency range.

The desired vehicle may be an actual vehicle or may be an imaginary vehicle having ideal cornering characteristics. Accordingly, it is possible to mount a large-sized engine on a rally car and simultaneously to improve the steering response characteristics.

The desired vehicle may be of a midship engine type. In this case, it is possible to make a front or rear engine vehicle have cornering characteristics equivalent to the characteristics of a midship engine vehicle.

Furthermore, the steering control system may be arranged to store sets of data of two or more desired vehicles, and to select one of the desired vehicles according to driver's volition.

The steering control system of the first embodiment is arranged to determine a desired value of the yaw acceleration. However, it is optional to employ the cornering force (or forces) and/or the side slip angle (or angles) and/or a centripetal acceleration in place of or together with the yaw acceleration. It is optional to arrange the steering control system to determine desired values of two or more dynamic variables.

In the first embodiment, the controlled vehicle is of a type in which both of the front wheel pair and the rear wheel pair are steerable. However, the present invention is not limited to such a type but applicable to a vehicle in which only the front wheel pair is steerable. In this case, the mechanical steering linkage between the steering wheel and the front wheels is replaced by a hydraulic steering unit as shown in the first embodiment, and the steering control system is arranged to determine a desired value of a front steering angle of the front wheels at the step 45 of FIG. 4. In this case, the rear wheel steering system is not required, so that the cost is reduced, and the construction of the system is simplified.

However, the steering control system of the first embodiment is more advantageous in safety because the front wheels can be steered through the mechanical steering linkage even if failure occurs in the microcomputer or other electrical unit or in the rear hydraulic steering system.

Figure 7:
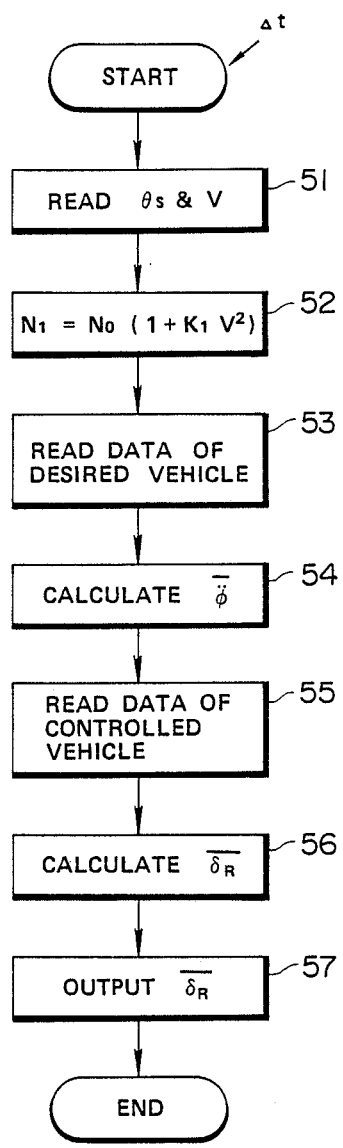
FIG. 7 is a flowchart showing a program used in the second embodiment of the present invention.

A second embodiment of the present invention is shown in FIG. 7.

In general, vehicles having a conventional mechanical steering linkage are designed to have understeering characteristics for the following reasons. First, an understeering vehicle is directionally stable and easy to handle for the average driver because the understeer reduces sensitivity (steering gain) of yaw rate to steering wheel angle in a high speed range. Secondly, an understeering vehicle is resistant to disturbance such as cross wind, irregularity of road surface and sidewise inclination of road surface, (that is, the behavior of an understeering vehicle is less disturbed by side loads).

However, in an understeering vehicle, responses of yawing motion and translational motion to steering wheel angular displacement become oscillatory in a high speed range. This undesired tendency becomes significant even at a speed of about 100 km/h, so that the directional control is lost if the steering wheel is turned rapidly.

Figure 14:
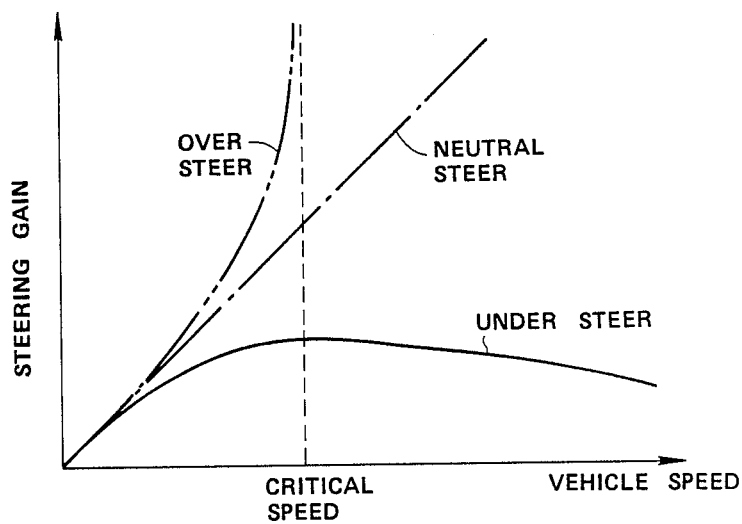
FIG. 14 is a graph showing relations between steering gain and vehicle speed for oversteer, neutral steer and understeer.

Oversteering and neutral-steering vehicles do not have such undesired oscillatory tendencies of the steering response characteristics. However, as shown in FIG. 14, the steering gains of oversteering and neutral-steering vehicles become excessively high especially in the high speed range. Accordingly, oversteering and neutral-steering vehicles are too responsive and unstable in the high speed range. Especially, an oversteering vehicle will spin near a critical vehicle speed.

The steering control system of the second embodiment is designed to be mounted on an understeering vehicle. That is, the controlled vehicle of the second embodiment has a construction which provides the controlled vehicle with understeering characteristics. The steering control system of the second embodiment is arranged to prevent the steering response from becoming oscillatory in the high speed range while maintaining the advantages of the understeering vehicle.

The steering control system of the second embodiment has the same construction as the first embodiment as shown in FIGS. 2 and 3 except the program of the microcomputer 1.

The program of the second embodiment is shown in FIG. 7. A step 51 is similar to the step 41 of FIG. 4.

At a step 52, the CPU of the microcomputer 1 determines an overall steering (gear) ratio $N_1$ of a desired vehicle in accordance with the following equation (21).

$$N_1 = N_0(1 + K_1 V^2) \quad (21)$$

In the second embodiment, the controlled vehicle has such a mechanical construction as to make the controlled vehicle understeering. The desired vehicle of the second embodiment is of the same type as the controlled vehicle. (The vehicle weight and the like of the desired vehicle are set approximately equal to those of the controlled vehicle). But the desired vehicle has neutral-steering characteristics unlike the controlled vehicle.

Figure 8:
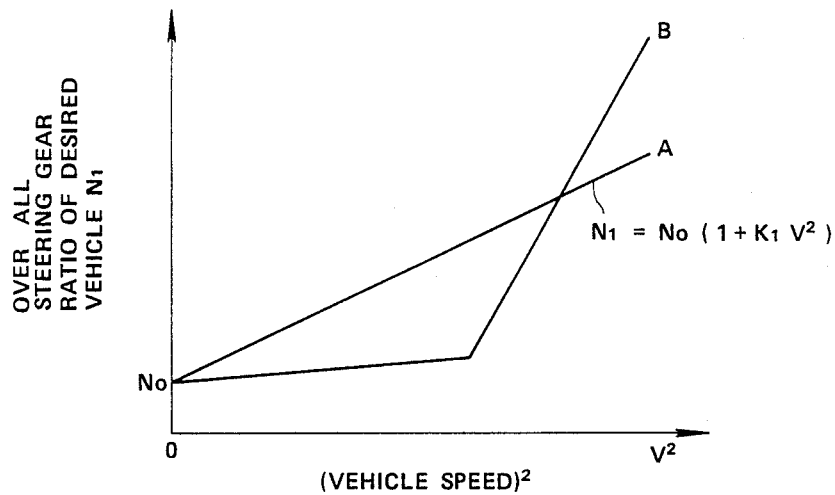
FIG. 8 is a graph showing a relation between a steering gear ratio of a desired vehicle and a vehicle speed.

The overall steering gear ratio $N_1$ of the desired vehicle is increased in such a manner that an increase in the overall steering gear ratio is proportional to an increase in the second power $V^2$ of the vehicle speed V, as shown by a straight line A in FIG. 8. Thus, the ratio of a steering angle of the steerable road wheels to an angular displacement $\theta_S$ of the steering wheel is decreased as the vehicle speed increases so that the directional stability can be improved in the high speed range.

In the second embodiment, $N_0$ of the equation (21) is set equal to an overall steering gear ratio $N_2$ of the controlled vehicle, and $K_1$ is set equal to a stability factor $A_2$ determined by the construction of the controlled vehicle ($K_1 = A_2$). Therefore, the desired vehicle has such a characteristic that, in a steady state circular motion, the magnitude of the yaw rate is given as if the stability factor of the desired vehicle is equal to the stability factor $A_2$ of the controlled vehicle. In the second embodiment, the desired vehicle is designed to serve not only to make the steering response non-oscillatory, as mentioned above, but also to maintain the stability in steering by preventing an excessive increase of the yaw rate in the high speed range notwithstanding the neutral steering characteristics of the desired vehicle.

A yawing moment of inertia $I_{Z1}$ of the desired vehicle of the second embodiment is set equal to a value smaller than a yawing moment of inertia $I_{Z2}$ of the controlled vehicle in order to improve the steering response characteristics in low and medium speed ranges together with the above-mentioned characteristic of the steering gear ratio $N_1$.

At a step 53, the CPU reads data of the desired vehicle (excluding the steering gear ratio $N_1$) from the memory.

In the second embodiment, the data of the desired vehicle read at the step 53 are as follows:

$I_{Z1}$ = the yawing moment of inertia of the desired vehicle, $M_1$ = a vehicle mass of the desired vehicle, $L_{F1}$ = a distance between a front axle and a center of gravity of the desired vehicle, $L_{R1}$ = a distance between a rear axle and the center of gravity of the desired vehicle, $K_{F1}$ = a cornering power of each of the front wheels of the desired vehicle, $K_{R1}$ = a cornering power of each of the rear wheels of the desired vehicle, In order to make the desired vehicle a neutral-steering vehicle, the following conditions must be satisfied.

$$L_{F1} = L_{R1} \quad (22),$$

$$K_{F1} = K_{R1} \quad (23)$$

In the second embodiment, $L_{F1}$, $L_{R1}$, $K_{F1}$ and $K_{R1}$ are set so that the equations (22) and (23) are satisfied.

The equations (22) and (23) are derived as follows: The stability factor $A_1$ of the desired vehicle is expressed as:

$$A_1 = -\frac{M_1}{2(L_{F1}+L_{R1})}, \frac{L_{F1}\cdot K_{F1}-L_{R1}\cdot K_{R1}}{K_{F1}\cdot K_{R1}} \quad (24)$$

The desired vehicle is neutral-steering when $A_1=0$, understeering when $A_1>0$, and oversteering when $A_1>0$. The equations (22) and (23) are one of conditions to make $A_1$ equal to zero.

At a step 54, the CPU determines a desired value of a dynamical variable corresponding to the sensed value of the steering input quantity $\bar{\theta}_S$ and the sensed value of the vehicle speed V by using the data of the desired vehicle. In the second embodiment, a desired value $\phi$ of the yaw acceleration is determined from the following equations of motion having two degrees of freedom (lateral motion and yaw).

$$M_1(\ddot{y}_1+\dot{\phi}_1 V)=2C_{F1}+2C_{R1} \quad (25)$$

$$I_{Z1}\ddot{\phi}_1=2L_{F1}C_{F1}-2L_{R1}C_{R1} \quad (26)$$

$$\beta_{F1}=(\theta_S)/N_1-(\dot{y}_1+L_{F1}\dot{\phi}_1)/V \quad (27)$$

$$\beta_{R1}=-(\dot{y}_1-L_{R1}\dot{\phi}_1)/V \quad (28)$$

$$C_{F1}=K_{F1}\cdot\beta_{F1} \quad (29)$$

$$C_{R1}=K_{R1}\cdot\beta_{R1} \quad (30)$$

$$\bar{\phi}=\ddot{\phi}_1 \quad (31)$$

where
$\dot{\phi}_1$ = a yaw rate of the desired vehicle,
$\ddot{\phi}_1$ = a yaw acceleration of the desired vehicle,
$\dot{y}_1$ = a lateral speed of the desired vehicle,
$\ddot{y}_1$ = a side slipping acceleration of the desired vehicle,
$\beta_{F1}$ = a side slip angle of the front wheels of the desired vehicle,
$\beta_{R1}$ = a side slip angle of the rear wheels of the desired vehicle,
$C_{F1}$ = a cornering force of each of the front wheels of the desired vehicle,
$C_{R1}$ = a cornering force of each of the rear wheels of the desired vehicle.

The equations (25) and (26) are equations of motion of the desired vehicle. These equations are solved by using an appropriate integration method as in the first embodiment.

The steering control system of the second embodiment thus determines the desired value of the yaw acceleration of the desired vehicle corresponding to the sensed values of the steering input quantity and vehicle speed V, and provides the controlled vehicle with the cornering characteristics of the desired vehicle by holding the yaw acceleration of the controlled vehicle equal to the desired value of the yaw acceleration.

In the second embodiment, this object is attained by calculating a desired value $\bar{\delta}_R$ of the rear steering angle of the rear wheels from the desired value $\phi$ of the yaw acceleration, and controlling the angle of the rear wheels in accordance with the desired value $\bar{\delta}_R$.

At the step 55, the CPU reads, from the memory, data of the controlled vehicle which are determined by the mechanical construction of the controlled vehicle. In the second embodiment, the data of the controlled vehicle are as follows:

$I_{Z2}$ = a yawing moment of inertia of the controlled vehicle,
$M_2$ = a vehicle mass of the controlled vehicle,
$L_{F2}$ = a distance between a front axle and a center of gravity of the controlled vehicle,
$L_{R2}$ = a distance between a rear axle and the center of gravity of the controlled vehicle,
$eK_{F2}$ = a front equivalent cornering power of each of the front wheels of the controlled vehicle,
$K_{R2}$ = a cornering power of each of the rear wheels of the controlled vehicle.

The front equivalent cornering power $eK_{F2}$ is given by:

$$eK_{F2} = K_{F2}\bigg/\left(1+\frac{2\xi_2}{N_2{}^2 K_{S2}}K_{F2}\right)$$

where $K_{S2}$ is a steering stiffness of the controlled vehicle, $\xi_2$ is a trail of the controlled vehicle, and $K_{F2}$ is a cornering power of each of the front wheels of the controlled vehicle.

In the second embodiment, the desired and controlled vehicles are of the same type. Therefore, the desired and controlled vehicles are equal in vehicle mass. That is, $M_1=M_2$.

At a step 56, the CPU of the microcomputer 1 performs operations to determine the desired value $\bar{\delta}_R$ of the rear steering angle for the rear wheels of the controlled vehicle required to achieve the desired value $\phi$ of the yaw acceleration in the controlled vehicle by using the following equations.

$$M_2(\ddot{y}_2+\dot{\phi}_2 V)=2C_{F2}+2C_{R2} \quad (32)$$

$$\beta_{F2}=(\theta_S)/N_2-(\dot{y}_2+L_{F2}\dot{\phi}_2)/V \quad (33)$$

$$C_{F2}=eK_{F2}\cdot\beta_{F2} \quad (34)$$

$$C_{R2}=(L_{F2}C_{F2}-\tfrac{1}{2}\bar{\phi}I_{Z2})/L_{R2} \quad (35)$$

$$\beta_{R2}=C_{R2}/K_{R2} \quad (36)$$

$$\bar{\delta}_R=\beta_{R2}+(\dot{y}_2-L_{R2}\dot{\phi}_2)/V \quad (37)$$

$$\dot{\phi}_1=\dot{\phi}_2 \quad (38)$$

where
$\dot{\phi}_2$ = a yaw rate of the controlled vehicle,
$\dot{y}_2$ = a lateral speed of the controlled vehicle,
$\ddot{y}_2$ = a side slipping acceleration of the controlled vehicle,
$\beta_{F2}$ = a side slip angle of the front wheels of the controlled vehicle,
$\beta_{R2}$ = a side slip angle of the rear wheels of the controlled vehicle,
$C_{F2}$ = a cornering force of each of the front wheels of the controlled vehicle,
$C_{R2}$ = a cornering force of each of the rear wheels of the controlled vehicle.

The equations of (32) and (33) are equations of motion of the controlled vehicle. These equations are solved by using the integration method used in the step 54.

At a step 57, the desired value $\bar{\delta}_R$ of the rear wheel steering angle is outputted to the rear wheel steering regulator 5. The rear regulator 5 steers the rear wheels 11 and 12 by supplying hydraulic pressure to the rear hydraulic actuator 7 in accordance with the desired value $\bar{\delta}_R$.

As a result, the yaw acceleration of the controlled vehicle is controlled so that it remains equal to the yaw acceleration of the desired vehicle (that is, the desired value of the yaw acceleration). Therefore, the controlled vehicle is provided with the characteristics of neutral steer while the construction of the body of the controlled vehicle maintains the understeering characteristics. The controlled vehicle of the second embodiment has the characteristic of an understeering vehicle that the steering gain is decreased in a high speed range to improve the directional stability. Simultaneously, the controlled vehicle of the second embodiment has non-oscillatory response characteristics which are a merit of a neutral-steering vehicle. The behavior of the controlled vehicle is controlled as if the controlled vehicle were a neutral-steering vehicle. Therefore, the steering response characteristics of the controlled vehicle are prevented from becoming oscillatory in spite of the fact that the controlled vehicle is inherently understeering.

In the second embodiment, the steering gear ratio $N_1$ of the desired vehicle is modified in accordance with the vehicle speed. Therefore, the steering control system of the second embodiment can further improve the stability in the high speed range, and improve the steering response in the low and medium speed ranges.

Figure 9:
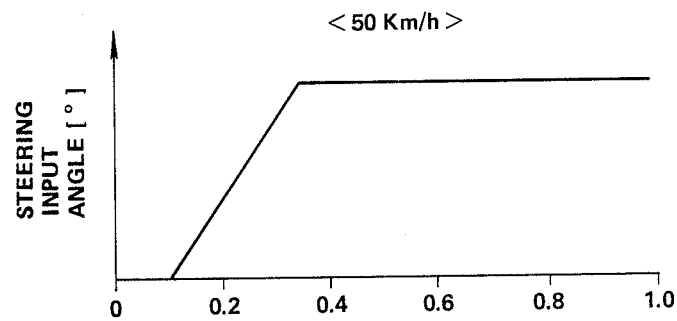
FIGS. 9-11 are graphs showing steering response characteristics of the controlled vehicle equipped with the control system of the second embodiment in different vehicle speed ranges.
Figure 9:
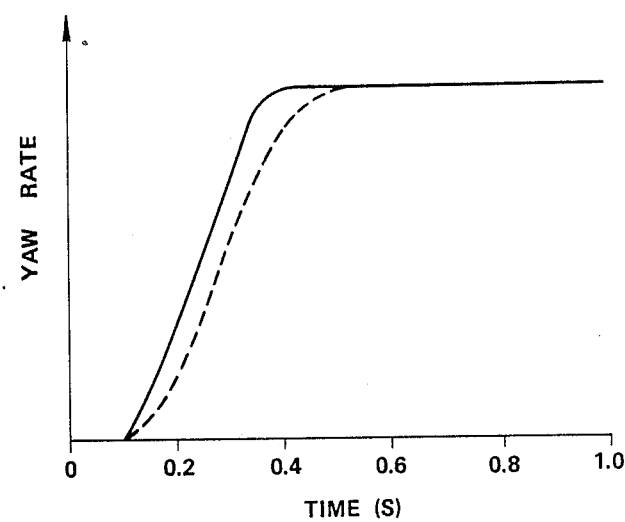
Figure 10:
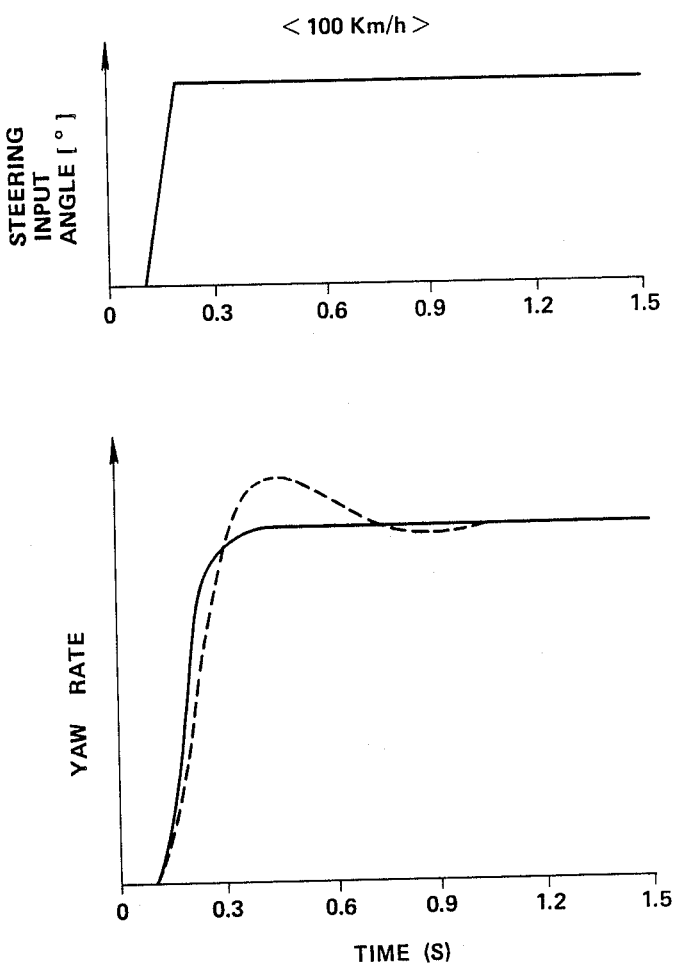
Figure 11:
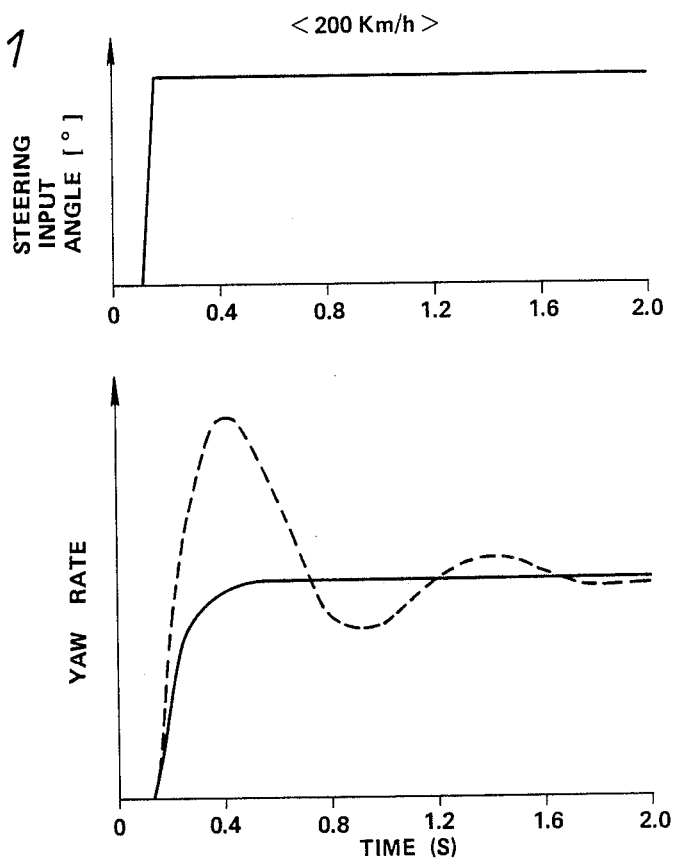

FIGS. 9–11 show the effect of the second embodiment. In an example shown in FIGS. 9–11, the data of the controlled vehicle are as follows:

$N_2 = 22.2$
$K_{F2} = 81.6$ [kgf/deg]
$K_{R2} = 132.6$ [kgf/deg]
$L_{F2} = 1.229$ [m]
$L_{R2} = 1.386$ [m]
$M_2 = 144$ [kgf.s$^2$/m]
$I_{Z2} = 230$ [kgf.m.s$^2$]
$A_2$ (stability factor) $= 1.42 \times 10^{-3}$ [s$^2$/m$^2$]. The data of the desired vehicle are as follows:
$N_0 (=N_2) = 22.2$
$A_1 (=A_2) = 1.42 \times 10^{-3}$ [s$^2$/m$^2$]
$K_{F1} = K_{R1} = 150$ [kgf/deg]
$L_{F1} = L_{R1} = 1.3075$ [m]
$M_1 = M_2 = 144$ [kgf.s$^2$/m]
$I_{Z1} (<I_{Z2}) = 100$ [kgf.m.s$^2$]

FIGS. 9–11 show actual changes of the yaw rate obtained when the steering wheel is turned at a steering speed of 720 deg/s, respectively, at vehicle speeds of 50 km/h, 100 km/h and 200 km/h. In each of FIGS. 9–11, a solid line shows a characteristic of the vehicle of the second embodiment, and a broken line shows a characteristic of a conventional understeering vehicle.

As evident from FIGS. 9–11, the steering response of the conventional understeering vehicle becomes oscillatory in a high vehicle speed range, and the oscillation of the yaw rate becomes more severe as the vehicle speed increases. By contrast, the yaw rate of the controlled vehicle of the second embodiment does not become oscillatory. Therefore, the controlled vehicle is stable even if the steering wheel is turned abruptly at high speeds. If, for example, a driver changes the direction of the controlled vehicle suddenly to avoid an imminent danger of a head-on collision with another vehicle stopping suddenly ahead of the controlled vehicle, the controlled vehicle of the second embodiment does not spin out unlike the conventional vehicle.

Figure 12:
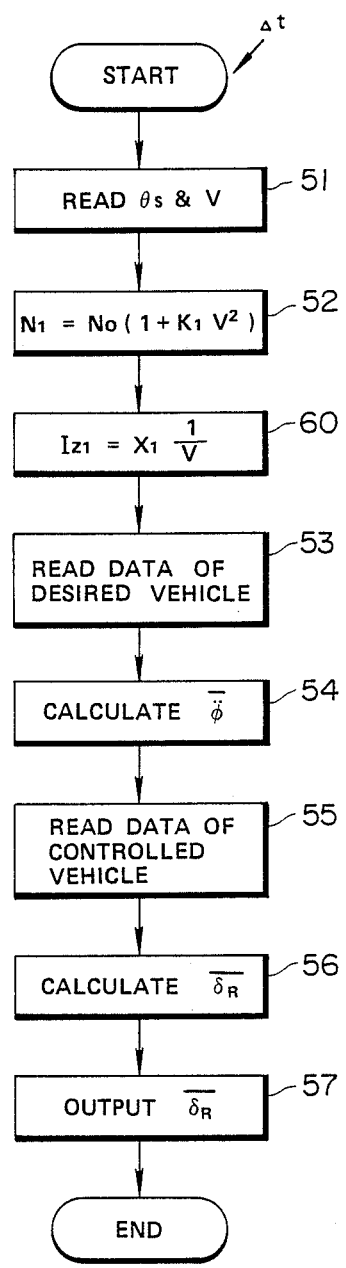
FIG. 12 is a flowchart showing a program used in the third embodiment of the present invention.

A third embodiment is shown in FIG. 12. The construction of a steering control system of the third embodiment is the same as those of the preceding embodiments as shown in FIGS. 2 and 3.

In the second embodiment, the yawing moment of inertia $I_{Z1}$ of the desired vehicle is set to a value smaller than the yawing moment of inertia $I_{Z2}$ of the controlled vehicle to obtain a sharp steering response. The yawing moment of inertia $I_{Z1}$ of the desired vehicle of the second embodiment is constant, so that the controlled vehicle of the second embodiment has a strong tendency to move straight ahead in a high speed range. Therefore, the controlled vehicle of the second embodiment is stable in the high speed range and suitable for use as a passenger car.

However, it is desirable to decrease the yawing moment of inertia $I_{Z1}$ in the case of a racing car or other vehicle requiring a speedy steering response in the high speed range. In the third embodiment, the yawing moment of inertia $I_{Z1}$ of the desired vehicle is varied in inverse proportion to the vehicle speed V.

The program of the third embodiment shown in FIG. 12 is different from the program of the second embodiment shown in FIG. 7 only in a step 60. The steps 51–52 and 53–57 of FIG. 12 are substantially identical to the steps 51–57 of FIG. 7, respectively. At the step 60 of FIG. 12, the CPU of the microcomputer 1 determines the yawing moment of inertia $I_{Z1}$ of the desired vehicle as follows:

$$I_{Z1} = X_1(1)/V$$

where $X_1$ is constant.

Figure 13:
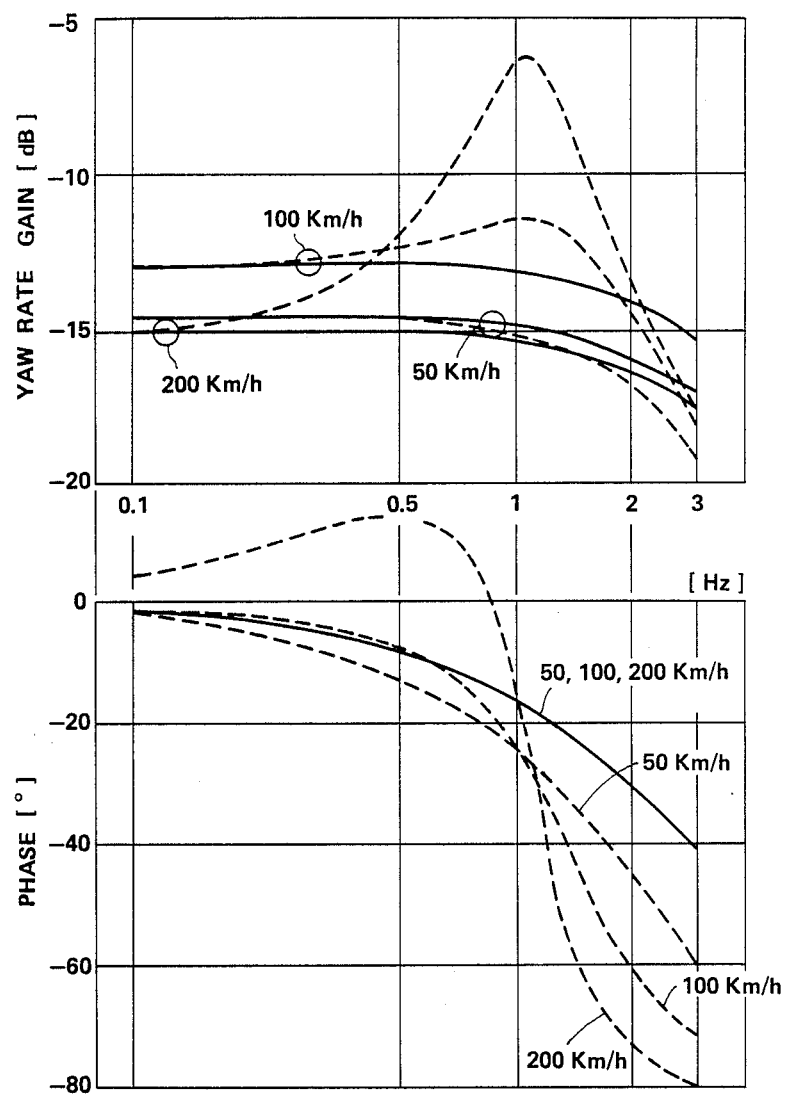
FIG. 13 is a graph showing frequency response characteristics of the controlled vehicle equipped with the control system of the third embodiment in different vehicle speed ranges.

FIG. 13 shows the frequency response characteristics, in yaw rate gain and phase difference, of the controlled vehicle of the third embodiment. Solid lines in FIG. 13 show characteristics of the controlled vehicle of the third embodiment, and broken lines show characteristics of a conventional vehicle.

As is evident from FIG. 13, the yaw rate gain of the conventional vehicle increases abruptly near a steering frequency of 1 Hz in the high speed range, so that the vehicle behaves severely. This tendency increases as the vehicle speed increases. The phase shift in the conventional vehicle is great, and varied according to the vehicle speed.

In the controlled vehicle of the third embodiment, by contrast, the yaw rate gain is stable against variation of the steering frequency, and the phase of the yaw rate is invariable with the vehicle speed, so that a stable cornering behavior can be obtained.

In the second and third embodiments, the desired vehicle is set as being a neutral-steering vehicle. However, it is possible to make the steering response non-oscillatory with the desired vehicle which is not a complete neutral-steering vehicle but a weakly understeering or oversteering vehicle. In this case, the data of the desired vehicle must satisfy the following two conditions in order to make the steering response neither oscillatory nor divergent.

$$D^2 - P^2 \geq 0 \text{ and } P^2 > 0$$

where $$D = \frac{1}{M_1 I_{Z1} V} \{ M_1 (L_{F1}^2 K_{F1} + L_{R1}^2 K_{R1}) + I_{Z1}(K_{F1} + K_{R1}) \}$$

$$P^2 = \frac{4 K_{F1} \cdot K_{R1}(L_{F1} + L_{R1})^2}{M_1 I_{Z1} V^2} - \frac{2(L_{F1} K_{F1} - L_{R1} K_{R1})}{I_{Z1}}$$

It is possible to obtain a non-oscillatory slight understeer or a non-divergent slight oversteer by setting the data of the desired vehicle so as to satisfy both of the above-mentioned conditions.

In the second and third embodiments, it is optional to employ the steering gear ratio $N_1$ of the desired vehicle which is not in a linear relationship with the second power of the vehicle speed V. For example, by employing a relationship between $N_1$ and $V^2$ shown by a line B in FIG. 8, it is possible to improve the stability in going straight ahead in the high speed range.

In the second and third embodiment, it is possible to increase the resistance against disturbance by strengthening the understeer of the construction of the controlled vehicle more than conventional vehicles. The control systems of the second and third embodiments can eliminate the possibility that the amplitude of oscillation of the steering response is increased by strengthening the understeer.

What is claimed is:

1. A steering control system for a controlled vehicle having a pair of first wheels and a pair of second wheels, comprising:

steering input sensing means for sensing a steering input quantity representing a driver's steering command of said controlled vehicle and determining a sensed value of said steering input quantity, vehicle speed sensing means for sensing a vehicle speed of said controlled vehicle and determining a sensed value of said vehicle speed, target behavior determining means connected with said steering input and vehicle speed sensing means for determining a desired value of at least one dynamic variable of a desired steering characteristic corresponding to said sensed values of said steering input quantity and said vehicle speed by solving a group of equations of motion of a vehicle having desired steering dynamics obtained by setting vehicle steering parameters equal to desired values representing said vehicle having desired steering dynamics by performing an integration process to determine an output quantity substantially equal to a time integral of an input quantity during turning movement of said controlled vehicle, steering angle determining means connected with said target behavior determining means for determining a desired value of a second wheel steering angle of said second wheels required to achieve said desired value of said dynamic variable by solving for said second wheel steering angle a group of equations of vehicle motion characteristic of said controlled vehicle using said desired value of said dynamic variable and actual values of vehicle parameters representative of said controlled vehicle by performing an integration process to determine an output quantity substantially equal to a time integral of an input quantity during turning movement of said controlled vehicle, and second wheel steering actuating means for steering said second wheels of said controlled vehicle so that the actual second wheel steering angle of said second wheels remains equal to said desired value of said second steering angle.

2. A steering control system according to claim 1 wherein said first wheels of said controlled vehicle are front wheels and said second wheels of said controlled vehicle are rear wheels, and wherein said steering control system further comprises a steering wheel and a mechanical steering linkage connected between said steering wheel and said first wheels for steering said first wheels in accordance with an angular displacement of said steering wheel.

3. A steering control system for a controlled vehicle having a pair of first wheels and a pair of second wheels, comprising:

steering input sensing means for sensing a steering input quantity representing a driver's steering command of said controlled vehicle and determining a sensed value of said steering input quantity, vehicle speed sensing means for sensing a vehicle speed of said controlled vehicle and determining a sensed value of said vehicle speed, target behavior determining means connected with said steering input and vehicle speed sensing means for determining a desired value of at least one dynamic variable of a desired steering characteristic corresponding to said sensed values of said steering input quantity and said vehicle speed by using a group of equations of motion of a vehicle having desired steering dynamics obtained by setting vehicle steering parameters comprising a yawing moment of inertia IZ, a vehicle mass M, a distance LF between a front axle and a center of gravity, a distance LR between a rear axle and the center of gravity, an overall steering gear ratio N, a cornering power KF of each of the first wheels, and a cornering power KR of each of the second wheels equal to desired values representing said vehicle having desired steering dynamics, said equations comprising an equation of lateral motion and an equation of yaw expressed, respectively, as:

$$M(\dot{y}+\dot{\phi}V)=2C_F+2C_F$$

$$I_Z\ddot{\phi}=2L_FC_F-2L_RC_R$$

where V is the vehicle speed, $\dot{\phi}$ is a yaw rate, $\ddot{\phi}$ is a yaw acceleration, $\dot{y}$ is a side slipping acceleration, $C_F$ is a cornering force of each of the front wheels, and $C_R$ is a cornering force of each of the rear wheels, steering angle determining means connected with said target behavior determining means for determining a desired value of a second wheel steering angle of said second wheels required to achieve said desired value of said dynamic variable by solving for said second wheel steering angle a group of equations of vehicle motion characteristic of said controlled vehicle using said desired value of said dynamic variable and actual values of vehicle parameters representative of said controlled vehicle, and second wheel steering actuating means for steering said second wheels of said controlled vehicle so that the actual second wheel steering angle of said second wheels remains equal to said desired value of said second steering angle.

4. A steering control system according to claim 3 wherein said angle determining means uses said equation of lateral motion and said equation of yaw.

5. A steering control system according to claim 4 wherein said dynamic variables comprise the yaw rate, the yaw acceleration and the lateral acceleration.

6. A steering control system according to claim 5 wherein said vehicle steering parameters further comprise a moment of inertia about a kingpin $I_K$, a steering stiffness $K_S$, a viscosity coefficient $D_K$ of a steering system, and a trail $\xi$, and wherein said group of equations further comprises an equation of a steering system expressed as follows:

$$I_K\delta_F = NK_S(\theta_S - N\delta_F) - D_K\delta_F - 2\xi C_F$$

where $\delta_F$ is a steering angle of the front wheels, and $\theta_S$ is the steering input quantity.

7. A steering control system according to claim 6 wherein said angle determining means further uses said equation of steering system.

8. A steering control system according to claim 7 wherein said target behavior determining means determines a desired value of the yaw acceleration.

9. A steering control system according to claim 8 wherein said target behavior determining means stores a plurality of sets of said desired values of said vehicle parameters.

10. A steering control system for a controlled vehicle having a pair of first wheels and a pair of second wheels, comprising:
  steering input sensing means for sensing a steering input quantity representing a driver's steering command of said controlled vehicle and determining a sensed value of said steering input quantity,
  vehicle speed sensing means for sensing a vehicle speed of said controlled vehicle and determining a sensed value of said vehicle speed,
  target behavior determining means connected with said steering input and vehicle speed sensing means for determining a desired value of at least one dynamic variable of a desired steering characteristic corresponding to said sensed values of said steering input quantity and said vehicle speed by using a group of equations of motion of a vehicle having desired steering dynamics obtained by setting vehicle steering parameters equal to desired values representing said vehicle having desired steering dynamics, wherein said vehicle steering parameters comprise a yawing moment of inertia of said vehicle having desired steering dynamics which is constant and smaller than an actual value of said yawing moment of inertia of said controlled vehicle,
  steering angle determining means connected with said target behavior determining means for determining a desired value of a second wheel steering angle of said second wheels required to achieve said desired value of said dynamic variable by solving for said second wheel steering angle a group of equations of vehicle motion characteristic of said controlled vehicle using said desired value of said dynamic variable and actual values of vehicle parameters representative of said controlled vehicle, and
  second wheel steering actuating means for steering said second wheels of said controlled vehicle so that the actual second wheel steering angle of said second wheels remains equal to said desired value of said second steering angle.

11. A steering control system according to claim 10, wherein said controlled vehicle has a steering construction which exhibits understeering characteristics, and said desired values of said vehicle steering parameters of said vehicle having desired steering dynamics are so set that said vehicle having desired steering dynamics has substantially neutralsteering characteristics irrespectively of variation of said vehicle speed.

12. A steering control system according to claim 11 wherein said vehicle steering parameters comprise an overall steering gear ratio.

13. A steering control system according to claim 12 wherein said overall steering gear ratio of said desired vehicle is a function of said vehicle speed.

14. A steering control system according to claim 13 wherein said overall steering gear ratio of said desired vehicle increases as said vehicle speed increases.

15. A steering control system according to claim 14 wherein said overall steering gear ratio is a linear function of the second power of said vehicle speed.

16. A steering control system according to claim 10 wherein said yawing moment of inertia of said desired vehicle is in inverse proportion to said vehicle speed.

17. A steering control system for a controlled vehicle having a pair of steerable wheels, comprising:
  steering input sensing means for sensing a steering input quantity representing a driver's steering command of said controlled vehicle,
  vehicle speed sensing means for sensing a vehicle speed of said controlled vehicle,
  target behavior determining means for determining a desired value of at least one dynamic variable of a desired dynamic steering characteristic in response to said steering input and said vehicle speed, said dynamic steering characteristic being selectively varied by a driver of the vehicle from among a plurality of stored data,
  steering angle determining means for determining a wheel steering angle of said wheels in response to said dynamic variable so that said wheel steering angle causes said controlled vehicle to exhibit cornering motion corresponding to said desired value of said dynamic variable, and
  wheel steering actuating means for steering said wheels of said controlled vehicle in response to said wheel steering angle,
wherein said desired dynamic steering characteristic is of a vehicle having desired steering dynamics and at least one vehicle steering parameter different from the corresponding vehicle steering parameter of said controlled vehicle, and wherein said target behavior determining means determines said desired value of said dynamic variable by solving a group of equations of motion of a vehicle having desired steering dynamics obtained by setting vehicle steering parameters equal to desired values corresponding to said vehicle having desired steering dynamics by performing an integration process to determine an output quantity substantially equal to a time integeral of an input quantity during turning movement of said controlled vehicle, and said steering angle determining means determines said wheel steering angle by performing an integration process using said desired value of said dynamic variable determined by said target behavior determining means and a group of equations of motion of said controlled vehicle obtained by setting vehicle steering parameters equal to actual steering parameter values of said controlled vehicle to determine an output quantity substantially equal to a time integral of an input quantity during turning movement of said controlled vehicle.

18. A steering control system according to claim 17 wherein said vehicle steering parameter varies depending on vehicle condition.

19. A steering control system according to claim 18 wherein said vehicle condition is vehicle speed.

20. A steering control system according to claim 19 wherein said vehicle steering parameter is overall steering gear ratio.

21. A steering control system according to claim 19 wherein said vehicle steering parameter is yawing moment of inertia.

* * * * *